(12) United States Patent
Ejiri

(10) Patent No.: US 7,137,404 B2
(45) Date of Patent: Nov. 21, 2006

(54) DIRECT ACTING PRESSURE REDUCING VALVE

(75) Inventor: Takashi Ejiri, Tokyo (JP)

(73) Assignee: Fujikura Rubber Ltd., Tokyo (JP)

( * ) Notice: Subject to any disclaimer, the term of this patent is extended or adjusted under 35 U.S.C. 154(b) by 279 days.

(21) Appl. No.: 10/798,000

(22) Filed: Mar. 11, 2004

(65) Prior Publication Data

US 2004/0177881 A1    Sep. 16, 2004

(30) Foreign Application Priority Data

Mar. 13, 2003  (JP) .............................. 2003-067722

(51) Int. Cl.
*G05D 16/02*  (2006.01)
*G05D 16/06*  (2006.01)

(52) U.S. Cl. .............................. 137/505.29; 137/505.34

(58) Field of Classification Search .......... 137/505.29, 137/505.32, 505.3, 505.34, 505.35, 505.39
See application file for complete search history.

(56) References Cited

U.S. PATENT DOCUMENTS

| | | | | | |
|---|---|---|---|---|---|
| 1,494,966 | A | * | 5/1924 | Twardowsky | ............ 137/505.3 |
| 1,512,243 | A | * | 10/1924 | Shrode | ................... 137/505.34 |
| 1,930,060 | A | * | 10/1933 | Newman et al. | ......... 137/454.5 |
| 3,089,513 | A | * | 5/1963 | Kirk, Jr. | ................. 137/505.34 |
| 4,313,460 | A | * | 2/1982 | Johnson | ...................... 137/489 |

\* cited by examiner

*Primary Examiner*—Stephen M. Hepperle
(74) *Attorney, Agent, or Firm*—McCormick, Paulding & Huber LLP

(57) ABSTRACT

A direct acting pressure reducing valve includes a valve-inlet pressure introduction port; a valve-outlet pressure output port; a main valve for opening and closing a communicating conduit; a pilot pressure chamber formed with a flexible diaphragm member; a communicating hole; a connecting rod inserted in the communicating hole; and a biasing member for biasing the flexible diaphragm member in a direction to open the main valve. An insertion portion of the connecting rod has a partly-deformed circular cross section, a distance from a deformed portion thereof to a center of an imaginary circle corresponding to the communicating hole being shorter than a radius of the imaginary circle. A non-deformed portion of the partly-deformed circular cross section guides the connecting rod along the communicating hole, while the deformed portion serves as an air passage via which the communicating conduit and the pilot pressure chamber are communicatively connected.

6 Claims, 4 Drawing Sheets

DIRECT ACTING PRESSURE REDUCING VALVE

CROSS REFERENCE TO RELATED APPLICATION

The present application is related to and claims priority of the following co-pending application, namely, Japanese patent application number 2003-067722 filed on Mar. 13, 2003. The above-identified application is incorporated herein by reference in its entirety.

BACKGROUND OF THE INVENTION

1. Field of the Invention

The present invention relates to a direct acting pressure reducing valve.

2. Description of the Related Art

A direct acting pressure reducing valve is known in the art. The valve includes a main valve which is disposed in a communicating conduit via which a valve-inlet pressure introduction port and a valve-outlet pressure output port are communicatively connected with each other. The valve-outlet pressure output port is communicatively connected with a pilot pressure chamber which is formed by a diaphragm (flexible diaphragm member). The pilot pressure chamber and the valve-inlet pressure introduction port are communicatively connected with each other via a circular communicating hole, in which a connecting rod is inserted to be freely movable in a sliding manner. The connecting rod is disposed between the diaphragm and the main valve, and the pressure in the pilot pressure chamber acts on the diaphragm to be equilibrium with the spring force of a pressure regulating spring and controls the valve-outlet pressure by movement of the connecting rod in response to movement of the diaphragm. The connecting rod acts on the main valve to move the main valve in a valve closing direction thereof when the pressure in the pilot pressure chamber exceeds the spring force of the pressure regulating spring, while the connecting rod moves down in a direction to open the main valve so that the pressure which is determined with the pressure regulating spring is output from the valve-outlet pressure output port.

In this conventional direct acting pressure reducing valve, it is desirable that the direct acting pressure reducing valve operates sensitively to vary a cross-sectional area of the main valve so that the pressure in the pilot pressure chamber and the spring force of the pressure regulating spring are balanced. It is known experientially that the size of the circular communicating hole, via which the pilot pressure chamber and the valve-inlet pressure introduction port are communicatively connected with each other, has a very large influence on the responsivity to variations of the flow rate on the valve-outlet side. The circular communicating hole, via which the pilot pressure chamber and the valve-inlet pressure introduction port are communicatively connected with each other, and the connecting rod, which is inserted in the circular communicating hole to be freely slidably movable therein, are constructed so that the connecting rod can slidably move in the circular communicating hole normally with a minimum clearance therebetween. In this type of pressure reducing valve, the pressure responsivity of the valve-outlet pressure tends to be delayed in response to a sudden variation of the valve-inlet pressure. It is known that the valve-outlet pressure overshoots especially when a pressure supply valve on the valve-inlet side is opened.

SUMMARY OF THE INVENTION

The present invention provides a direct acting pressure reducing valve whose pressure characteristics and flow rate characteristics are well balanced without any complicated internal structures or any extra parts.

According to an aspect of the present invention, a direct acting pressure reducing valve is provided, including a valve-inlet pressure introduction port, a valve-outlet pressure output port; a main valve for opening and closing a communicating conduit via which the valve-inlet pressure introduction port and the valve-outlet pressure output port are communicatively connected with each other, a pilot pressure chamber formed with a flexible diaphragm member to be communicatively connected with the valve-outlet pressure output port, a cylindrical communicating hole via which the pilot pressure chamber and the communicating conduit are communicatively connected with each other, a connecting rod inserted in the cylindrical communicating hole to be slidably movable therein and positioned between the flexible diaphragm member and the main valve, and a pressure-adjusting biasing member for biasing the flexible diaphragm member in a direction to open the main valve. An insertion portion of the connecting rod which is inserted in the cylindrical communicating hole is shaped to have a partly-deformed circular cross section, a distance from a deformed portion of the partly-deformed circular cross section to a center of an imaginary circle corresponding to an inner peripheral surface of the cylindrical communicating hole being shorter than a radius of the imaginary circle. A non-deformed portion of the partly-deformed circular cross section of the insertion portion serves as a guide portion for guiding the connecting rod along an axis of the cylindrical communicating hole, while the deformed portion of the partly-deformed circular cross section of the insertion portion serves as an air passage via which the communicating conduit and the pilot pressure chamber are communicatively connected with each other.

It is desirable for the shape of the insertion portion to constitute a major portion of an imaginary cylindrical rod, and wherein the deformed portion of the insertion portion of the connecting rod includes a flat portion which defines a cut-off portion of the imaginary cylindrical rod, the flat portion extending in an axial direction of the imaginary cylindrical rod.

It is desirable for the connecting rod to include a flange portion provided at an end of the connecting rod in the pilot pressure chamber. A surface of the flange portion adjacent to the cylindrical communicating hole includes a recessed portion communicatively connected with the deformed portion of the insertion portion of the connecting rod.

It is desirable for the direct acting pressure reducing valve to include a body and a bonnet, wherein an outer edge of the flexible diaphragm member is held tight between the body and the bonnet. The body can include the valve-inlet pressure introduction port, the valve-outlet pressure output port, and a communicating conduit via which the valve-inlet pressure introduction port and the valve-outlet pressure output port are communicatively connected with each other.

It is desirable for the cylindrical communicating hole to be formed on a bushing which is screwed into the communicating conduit.

It is desirable for the pressure-adjusting biasing member to be a compression coil spring positioned in the bonnet.

It is desirable for the connecting rod to include a pushing portion positioned at the other end of the connecting rod, and for the direct acting pressure reducing valve to include a biasing member for biasing the main valve against an end of the pushing portion.

In another embodiment of the present invention, a direct acting pressure reducing valve is provided, including a valve-inlet pressure introduction port, a valve-outlet pressure output port, a main valve for opening and closing a communicating conduit via which the valve-inlet pressure introduction port and the valve-outlet pressure output port are communicatively connected with each other, a pilot pressure chamber formed with a flexible diaphragm member to be communicatively connected with the valve-outlet pressure output port, a cylindrical communicating hole via which the pilot pressure chamber and the communicating conduit are communicatively connected with each other, a connecting rod inserted in the cylindrical communicating hole to be slidably movable therein and positioned between the flexible diaphragm member and the main valve, and a pressure-adjusting biasing member for biasing the flexible diaphragm member in a direction to open the main valve. The direct acting pressure reducing valve operates so that a pressure in the pilot pressure chamber acts on the flexible diaphragm member to be in equilibrium with a biasing force of the pressure-adjusting biasing member. A portion of an inner peripheral surface of the cylindrical communicating hole is recessed radially outwards to serve as an air passage which is elongated in an axial direction of the cylindrical communicating hole, the communicating conduit and the pilot pressure chamber being communicatively connected with each other via the air passage.

It is desirable for the direct acting pressure reducing valve to include a body and a bonnet, wherein an outer edge of the flexible diaphragm member is held tight between the body and the bonnet. The body can include the valve-inlet pressure introduction port, the valve-outlet pressure output port, and a communicating conduit via which the valve-inlet pressure introduction port and the valve-outlet pressure output port are communicatively connected with each other.

It is desirable for the cylindrical communicating hole to be formed on a bushing which is screwed into the communicating conduit.

It is desirable for the pressure-adjusting biasing member to be a compression coil spring positioned in the bonnet.

Providing either the connecting rod or the cylindrical communicating hole with an air passage via which the communicating conduit and the pilot pressure chamber are communicatively connected with each other makes it possible to achieve a direct acting pressure reducing valve whose pressure characteristics and flow rate characteristics are well balanced. A cross-sectional area of the air passage can be determined by trial and error.

BRIEF DESCRIPTION OF THE DRAWINGS

The present invention will be described below in detail with reference to the accompanying drawings in which.

DESCRIPTION OF THE PREFERRED EMBODIMENTS

Figure 1:
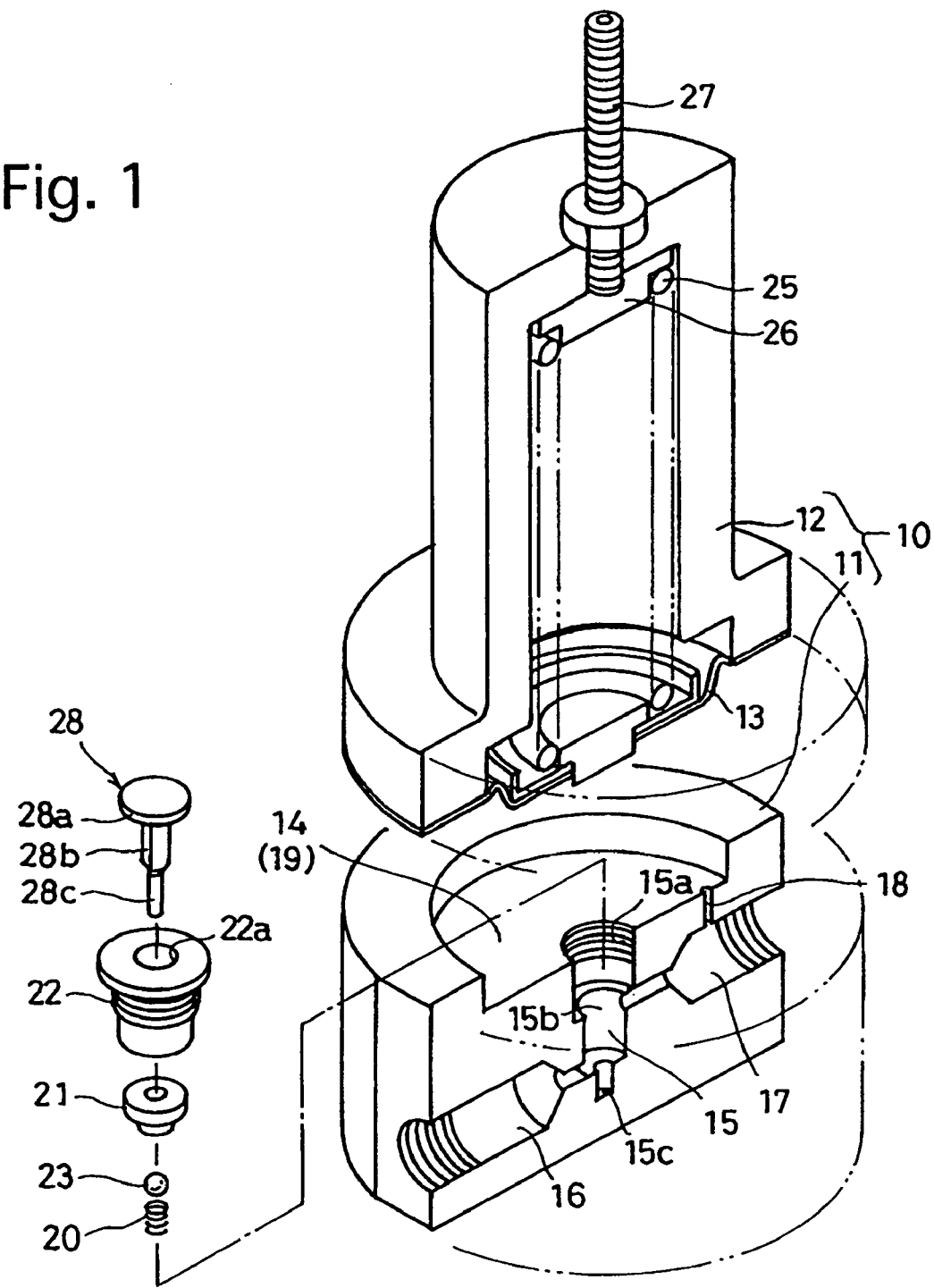
FIG. 1 is an exploded perspective view of an embodiment of a direct acting pressure reducing valve according to the present invention.

FIG. 1 shows an overall structure of an embodiment of a direct acting pressure reducing valve according to the present invention. The direct acting pressure reducing valve 10 is provided with a body 11 and a bonnet 12 which have a cylindrical shape viewed as a whole. The direct acting pressure reducing valve 10 is provided between the body 11 and the bonnet 12 with a diaphragm (flexible diaphragm member) 13 an outer edge of which is held tight between the body 11 and the bonnet 12. The body 11 is provided on an end thereof adjacent to the diaphragm 13 with a pilot-pressure-chamber forming recess 14. The body 11 is provided, at a center of the pilot-pressure-chamber forming recess 14 along an axis of the body 11, with a communicating conduit 15 via which a valve-inlet pressure introduction port 16 and a valve-outlet pressure output port 17 that extend radially in opposite directions are communicatively connected with each other. A pilot pressure chamber 19 is formed by the diaphragm 13 and the pilot-pressure-chamber forming recess 14. The pilot pressure chamber 19 and the valve-outlet pressure output port 17 are communicatively connected with each other via a communicating through hole 18.

The communicating conduit 15 consists of a bushing screw hole 15a, a valve-seat fixing hole 15b and a spring-insertion bottomed hole 15c in that order from the pilot pressure chamber 19. A compression coil spring (main valve spring) 20 is inserted into the spring-insertion bottomed hole 15c. An annular valve seat 21 made of a resilient material is inserted into the valve-seat fixing hole 15b to be fixed thereto. A bushing 22 is screwed into the bushing screw hole 15a to be fixed thereto. A valve body (ball element) 23 serving as a main valve for closing the communicating conduit 15 by contacting with the annular valve seat 21 by the spring force of the compression coil spring 20 is positioned between the compression coil spring 20 and the annular valve seat 21. The compression coil spring 20, the annular valve seat 21 and the valve body 23 constitute a normally-closed main valve. The annular valve seat 21 and the bushing 22 can be formed integral with each other.

Figure 2:
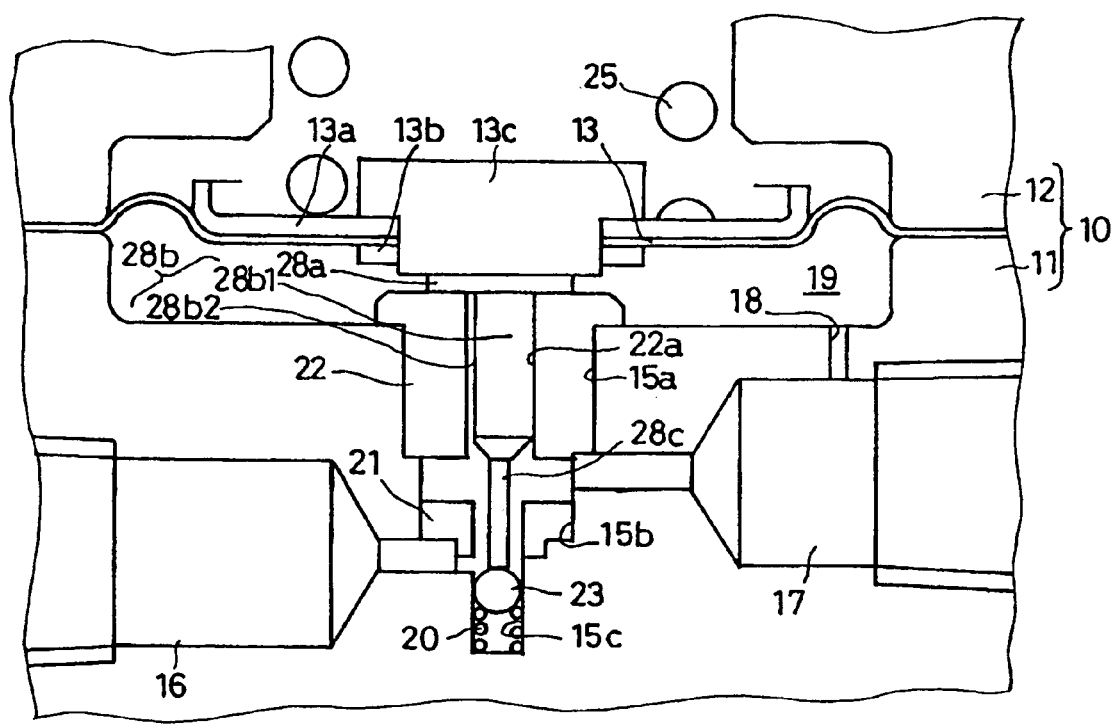
FIG. 2 is a longitudinal cross sectional view of a portion of the direct acting pressure reducing valve in an assembled state, showing a valve-opened state.
Figure 3:
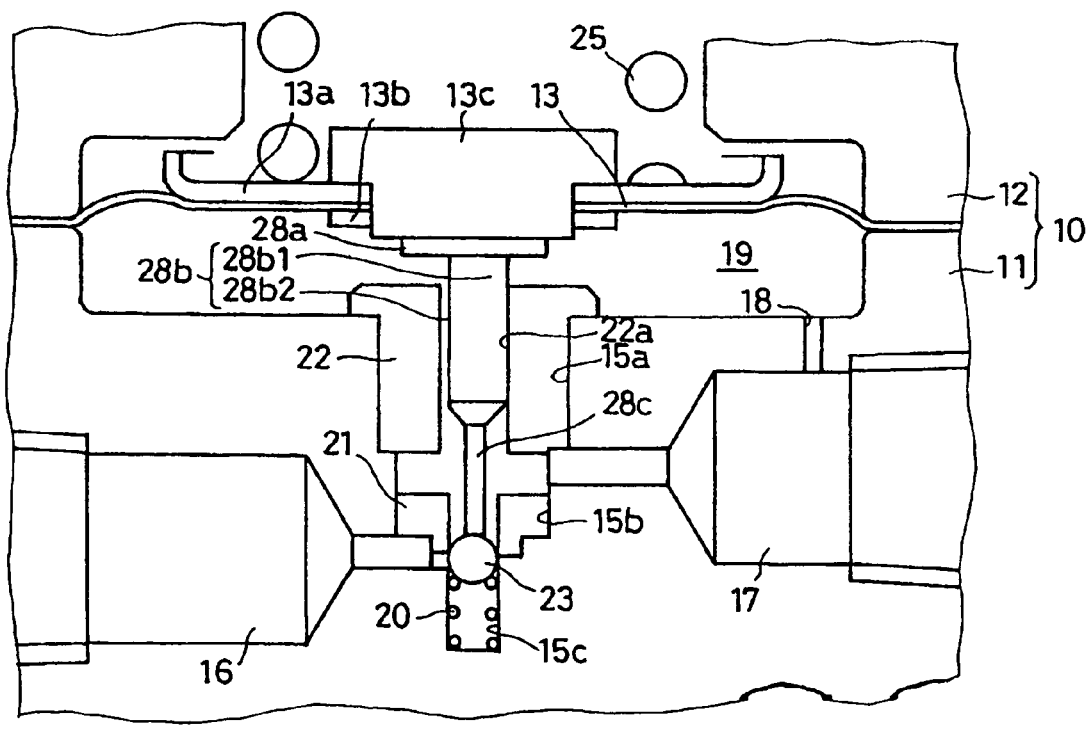
FIG. 3 is a view similar to that of FIG. 2, showing a valve-closed state.

As shown in FIGS. 2 and 3, the diaphragm 13 is provided on a top surface and a bottom surface thereof with a piston 13a and a retainer plate 13b, respectively, which are coupled to each other by a center guide 13c. The direct acting pressure reducing valve 10 is provided inside the bonnet 12, which is shaped like an inverted bottomed cylinder to bear the diaphragm 13 at the bottom thereof, with a pressure adjusting spring (pressure-adjusting biasing member) 25 whose one end (bottom end) contacts with the piston 13a of the diaphragm 13. The direct acting pressure reducing valve 10 is provided in the bonnet 12 with a spring receiving plate 26 which is positioned on the opposite side of the pressure adjusting spring 25 from the diaphragm 13 to be freely movable in the bonnet 12 in an axial direction thereof. The spring receiving plate 26 is in contact with a end of a pressure-adjustment screw shaft 27 which is screwed through a female screw hole formed on a top end wall of the bonnet 12 at a center thereof. The spring force of the pressure adjusting spring 25 which is exerted on the diaphragm 13 can be adjusted by moving the spring receiving plate 26 up and down relative to the bonnet 12 by changing the position of screw-engagement of the pressure-adjustment screw shaft 27.

The bushing 22 is provided on an axis thereof with a cylindrical communicating hole 22a via which the pilot pressure chamber 19 and the communicating conduit 15 (i.e., the pilot pressure chamber 19 and the valve-inlet pressure introduction port 16) are communicatively connected with each other. The connecting rod 28 is positioned in the communicating hole 22a to be freely movable therein. The connecting rod 28 is provided with a flange portion 28a, a sliding shaft portion 28b and a pushing portion 28c. The flange portion 28a is positioned in the pilot pressure chamber 19 to contact with the center guide 13c of the diaphragm 13. The sliding shaft portion 28b is slidably fitted in the communicating hole 22a. An end of the pushing portion 28c contacts the valve body 23. It is possible to omit the flange portion 28a from the connecting rod 28.

Figure 4A:
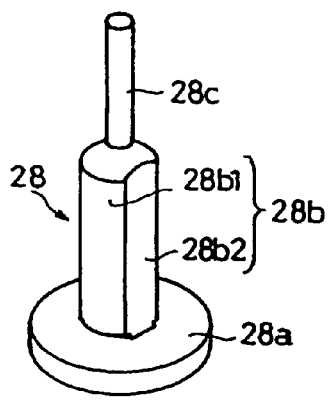
FIG. 4A is a perspective view of an embodiment of a connecting rod shown in FIG. 1.
Figure 4B:
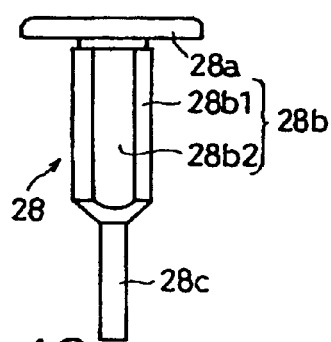
FIG. 4B is a front elevational view of the connecting rod shown in FIG. 4A.
Figure 4C:
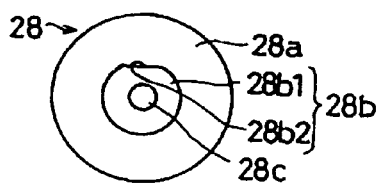
FIG. 4C is a plan view of the connecting rod shown in FIG. 4A.

FIGS. 4A, 4B and 4C show external views of an embodiment of the connecting rod 28. As can be clearly seen from FIGS. 4A through 4C, the sliding shaft portion 28b is provided with a cylindrical shaft portion 28b1, and a side flat portion 28b2 which is formed in a manner to cut off a portion of the cylindrical shaft portion 28b1 in an axial direction thereof. In other words, a cross sectional shape of the sliding shaft portion 28b includes a round portion (the cylindrical shaft portion 28b1) which constitutes a major portion of an imaginary circle corresponding to an inner peripheral surface of the communicating hole 22a, and a flat portion (the side flat portion 28b2) which defines a cut-off portion (segment) of the aforementioned imaginary circle. Namely, an insertion portion (sliding shaft portion 28b) of the connecting rod 28 which is inserted in the cylindrical communicating hole 22a is shaped to have a partly-deformed circular cross section, a distance from a center of the aforementioned imaginary circle to a deformed portion of the partly-deformed circular cross section being smaller than a radius of the imaginary circle. The connecting rod 28 is slidably guided in the communicating hole 22a in the axial direction thereof by the cylindrical shaft portion 28b1, while an air passage via which the communicating conduit 15 and the pilot pressure chamber 19 are communicatively connected with each other is formed in the communicating hole 22a by the side flat portion 28b2. The area on which the side flat portion 28b2 is formed on the sliding shaft portion 28b and the depth of the side flat portion 28b2 are predetermined so that the cross-sectional area of the aforementioned air passage is sufficiently large enough without causing any harmful play between the connecting rod 28 and the communicating hole 22a.

The flange portion 28a serves to prevent the connecting rod 28 from coming out of the communicating hole 22a from the underside thereof adjacent to the valve body 23. In a state shown in FIG. 2 where the flange portion 28a contacts with the end surface (the upper end surface as viewed in FIG. 2) of the bushing 22 which is positioned in the pilot pressure chamber 19, the pushing portion 28c presses the valve body 23 downwards as viewed in FIG. 2 to open the valve (valve-inlet pressure introduction port 16).

Figure 5A:
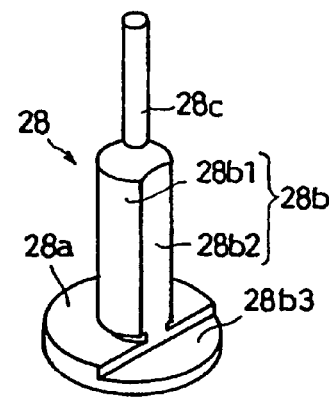
FIG. 5A is a perspective view of another embodiment of the connecting rod shown in FIG. 1.
Figure 5B:
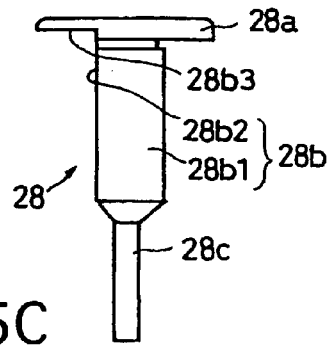
FIG. 5B is a front elevational view of the connecting rod shown in FIG. 5A.
Figure 5C:
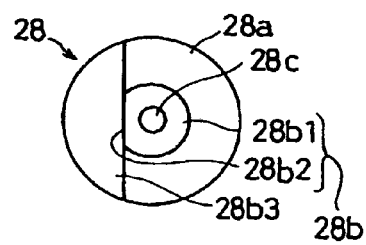
FIG. 5C is a plan view of the connecting rod shown in FIG. 5A.

FIGS. 5A, 5B and 5C show external views of another embodiment of the connecting rod 28. In this embodiment of the connecting rod 28, the aforementioned air passage, via which the communicating conduit 15 and the pilot pressure chamber 19 are communicatively connected with each other, remains in an opened state even if the flange portion 28a contacts the upper end surface of the bushing 22 as shown in FIG. 2. In this embodiment shown in FIGS. 5A, 5B and 5C, the flange portion 28a is provided, on a bottom surface thereof (i.e., a contacting surface which is capable of contacting with the upper end surface of the bushing 22) adjacent to the cylindrical communicating hole 22a, with a flat-cutout portion (recessed portion) 28b3 which is communicatively connected with the side flat portion 28b2.

The direct acting pressure reducing valve 10 that has the above described structure operates so that the pressure in the pilot pressure chamber 19 acts on the diaphragm 13 to be in equilibrium with the spring force of the pressure adjusting spring 25, and controls a cross-sectional area of the communicating conduit 15 by movement of the connecting rod 28 in response to movement of the diaphragm 13 to ensure the valve-outlet pressure and the flow rate on the valve-outlet side. In the case where the flow on the valve-outlet side is shut, the main valve is also shut to keep the valve-outlet pressure constant.

Additionally, in the direct acting pressure reducing valve 10, the connecting rod 28 is slidably guided with stability by the engagement of the cylindrical shaft portion 28b1 with an inner peripheral surface of the bushing 22 in the communicating hole 22a, while the air passage between the communicating conduit 15 and the pilot pressure chamber 19 is secured by the side flat portion 28b2 (and the flat-cutout portion 28b3 in the embodiment shown in FIGS. 5A through 5C). Therefore, a sudden variation of the valve-inlet pressure in the valve-inlet pressure introduction port 16 can be transferred to the pilot pressure chamber 19 rapidly, and accordingly, an even more stable valve-outlet pressure can be output from the valve-outlet pressure output port 17. Specifically, the valve-outlet pressure is prevented from overshooting in the valve-outlet pressure output port 17 when the valve-inlet pressure in the valve-inlet pressure introduction port 16 suddenly rises. In addition, since no fine adjustment for the diameter of the communicating hole 22a and the diameter of the sliding shaft portion 28b is needed, a direct acting pressure reducing valve which operates with stability without requiring a lot of skill is achieved.

Figure 6A:
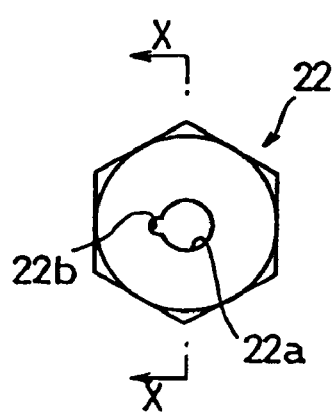
FIG. 6A is a plan view of an embodiment of a bushing shown in FIG. 1.
Figure 6B:
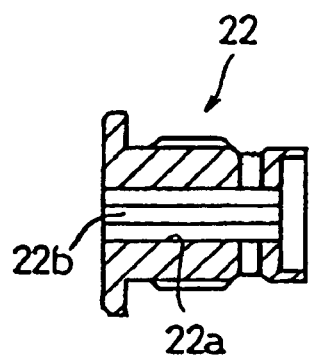
FIG. 6B is a cross sectional view taken along X—X line shown in FIG. 6A.
Figure 6C:
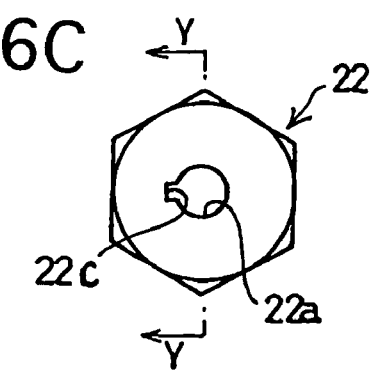
FIG. 6C is a plan view of another embodiment of the bushing shown in FIG. 1.
Figure 6D:
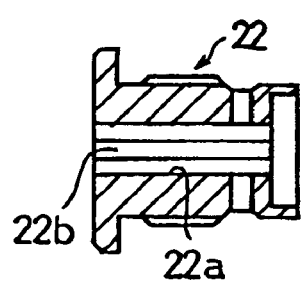
FIG. 6D is a cross sectional view taken along Y—Y line shown in FIG. 6C.

FIGS. 6A and 6B show another embodiment of the bushing 22, and FIGS. 6C and 6D show another embodiment of the bushing 22. In each of these two embodiments shown in FIGS. 6A through 6D, a connecting rod (which corresponds to the connecting rod 28) whose cylindrical shaft portion (which corresponds to the cylindrical shaft portion 28b1) has no side flat portion (which corresponds to the side flat portion 28b2) is used instead of the connecting rod 28 of the previous embodiment shown in FIG. 4A through 4C or 5A through 5C. Accordingly, the cylindrical shaft portion of the connecting rod in each of these two embodiments has a circular cross section. In the embodiment shown in FIGS. 6A and 6B, instead of forming the side flat portion 28b2 on the connecting rod 28, the bushing 22 is provided in the communicating hole 22a with a round air passage recess 22b which is recessed radially outwards and elongated in the axial direction of the communicating hole 22a. Likewise, in the embodiment shown in FIGS. 6C and 6D, the bushing 22 is provided in the communicating hole 22a with a square air passage recess 22c which is recessed radially outwards and elongated in the axial direction of the communicating hole 22a. Similar effects can be obtained in either embodiment shown in FIGS. 6A through 6D.

According to the present invention, a direct acting pressure reducing valve having fast response and high stability in a balanced manner is achieved without employing any complicated components.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A direct acting pressure reducing valve comprising:
a valve-inlet pressure introduction port;
a valve-outlet pressure output port;
a main valve for opening and closing a communicating conduit via which said valve-inlet pressure introduction port and said valve-outlet pressure output port are communicatively connected with each other;
a pilot pressure chamber formed with a flexible diaphragm member to be communicatively connected with said valve-outlet pressure output port; a cylindrical communicating hole via which said pilot pressure chamber and said communicating conduit are communicatively connected with each other;
a connecting rod inserted in said cylindrical communicating hole to be slidably movable therein and positioned between said flexible diaphragm member and said main valve; and
a pressure-adjusting biasing member for biasing said flexible diaphragm member in a direction to open said main valve;
wherein an insertion portion of said connecting rod which is inserted in said cylindrical communicating hole is shaped to have a partly-deformed circular cross section, a distance from a deformed portion of the partly-deformed circular cross section to a center of an imaginary circle corresponding to an inner peripheral surface of said cylindrical communicating hole being smaller than a radius of said imaginary circle;
wherein a non-deformed portion of said partly-deformed circular cross section of said insertion portion serves as a guide portion for guiding said connecting rod along an axis of said cylindrical communicating hole, while said deformed portion of said partly-deformed circular cross section of said insertion portion serves as an air passage via which said communicating conduit and said pilot pressure chamber are communicatively connected with each other; and
wherein the shape of said insertion portion constitutes a major portion of an imaginary cylindrical rod, and wherein said deformed portion of said insertion portion of said connecting rod comprises a flat portion which defines a cut-off portion of said imaginary cylindrical rod, said flat portion extending in an axial direction of said imaginary cylindrical rod.

2. A direct acting pressure reducing valve comprising:
a valve-inlet pressure introduction port;
a valve-outlet pressure output port;
a main valve for opening and closing a communicating conduit via which said valve-inlet pressure introduction port and said valve-outlet pressure output port are communicatively connected with each other;
a pilot pressure chamber formed with a flexible diaphragm member to be communicatively connected with said valve-outlet pressure output port; a cylindrical communicating hole via which said pilot pressure chamber and said communicating conduit are communicatively connected with each other;
a connecting rod inserted in said cylindrical communicating hole to be slidably movable therein and positioned between said flexible diaphragm member and said main valve; and
a pressure-adjusting biasing member for biasing said flexible diaphragm member in a direction to open said main valve;
wherein an insertion portion of said connecting rod which is inserted in said cylindrical communicating hole is shaped to have a patly-deformed circular cross section, a distance from a deformed portion of the partly-deformed circular cross section to a center of an imaginary circle corresponding to an inner peripheral surface of said cylindrical communicating hole being smaller than a radius of said imaginary circle;
wherein a non-deformed portion of said partly-deformed circular cross section of said insertion portion serves as a guide portion for guiding said connecting rod along an axis of said cylindrical communicating hole, while said deformed portion of said partly-deformed circular cross section of said insertion portion serves as an air passage via which said communicating conduit and said pilot pressure chamber are communicatively connected with each other;
wherein said connecting rod comprises a flange portion provided at an end of said connecting rod in said pilot pressure chamber; and
wherein a surface of said flange portion adjacent to said cylindrical communicating hole includes a recessed portion communicatively connected with said deformed portion of said insertion portion of said connecting rod.

3. The direct acting pressure reducing valve according to claim 1, said direct acting pressure reducing valve further comprising a body and a bonnet;
wherein an outer edge of said flexible diaphragm member is held tight between said body and said bonnet; and
wherein said body includes said valve-inlet pressure introduction port, said valve-outlet pressure output part, and a communicating conduit via which said valve-inlet pressure introduction port and said valve-outlet pressure output port are communicatively connected with each other.

4. The direct acting pressure reducing valve according to claim 3, wherein said cylindrical communicating hole is formed on a bushing which is screwed into said communicating conduit.

5. The direct acting pressure reducing valve according to claim 3, wherein said pressure-adjusting biasing member comprises a compression coil spring positioned in said bonnet.

6. The direct acting pressure reducing valve according to claim 2, wherein said connecting rod comprises a pushing portion positioned at the other end of said connecting rod; and
wherein said direct acting pressure reducing valve further comprises a biasing member for biasing said main valve against an end of said pushing portion.

* * * * *

UNITED STATES PATENT AND TRADEMARK OFFICE
CERTIFICATE OF CORRECTION

PATENT NO. : 7,137,404 B2
APPLICATION NO. : 10/798000
DATED : November 21, 2006
INVENTOR(S) : Takashi Ejiri It is certified that error appears in the above-identified patent and that said Letters Patent is hereby corrected as shown below:

Column 8, line 39, the word "part" should be replaced with --port--.

Signed and Sealed this

Sixth Day of February, 2007

JON W. DUDAS
*Director of the United States Patent and Trademark Office*